United States Patent Office 3,405,575
Patented Oct. 15, 1968

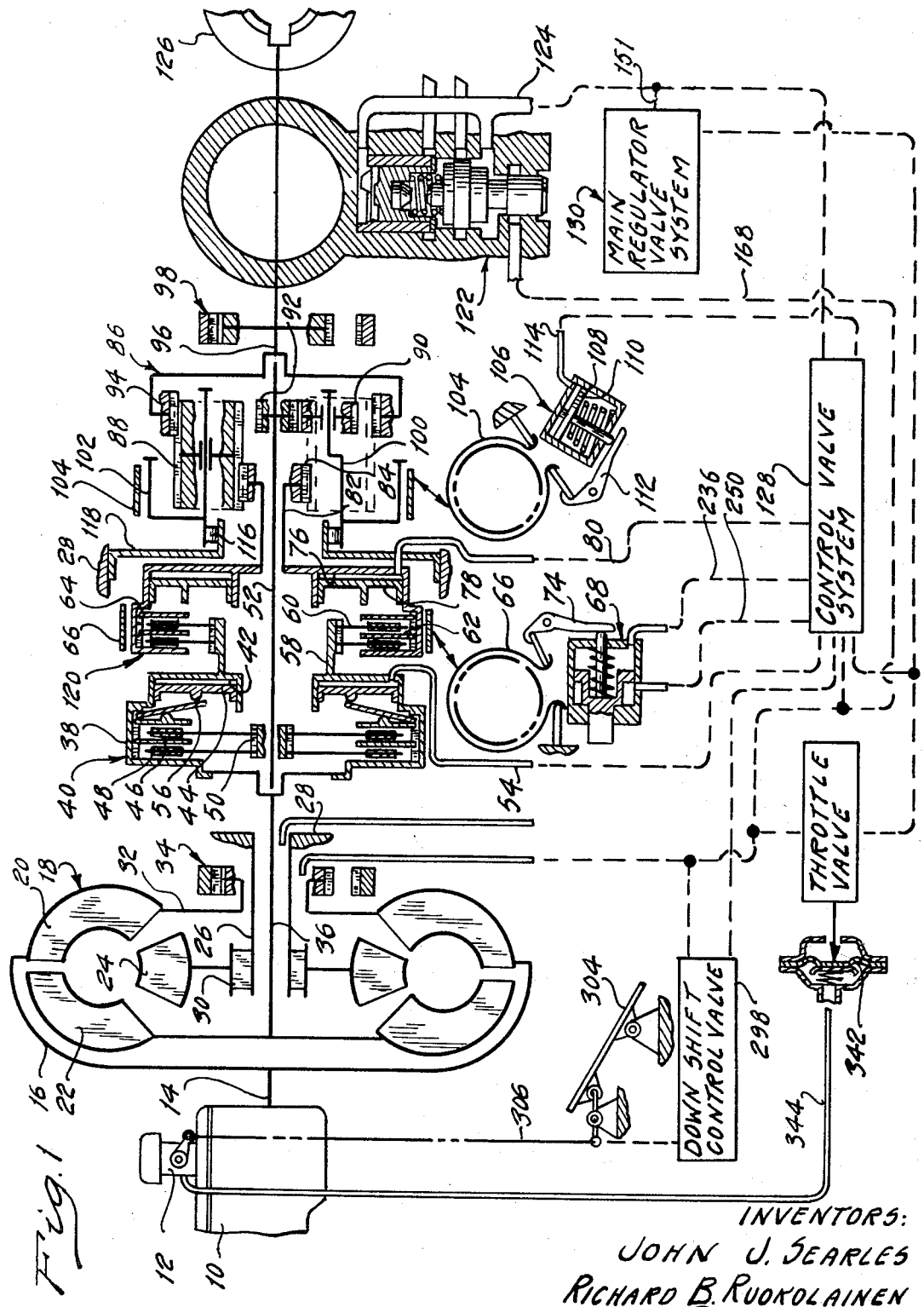

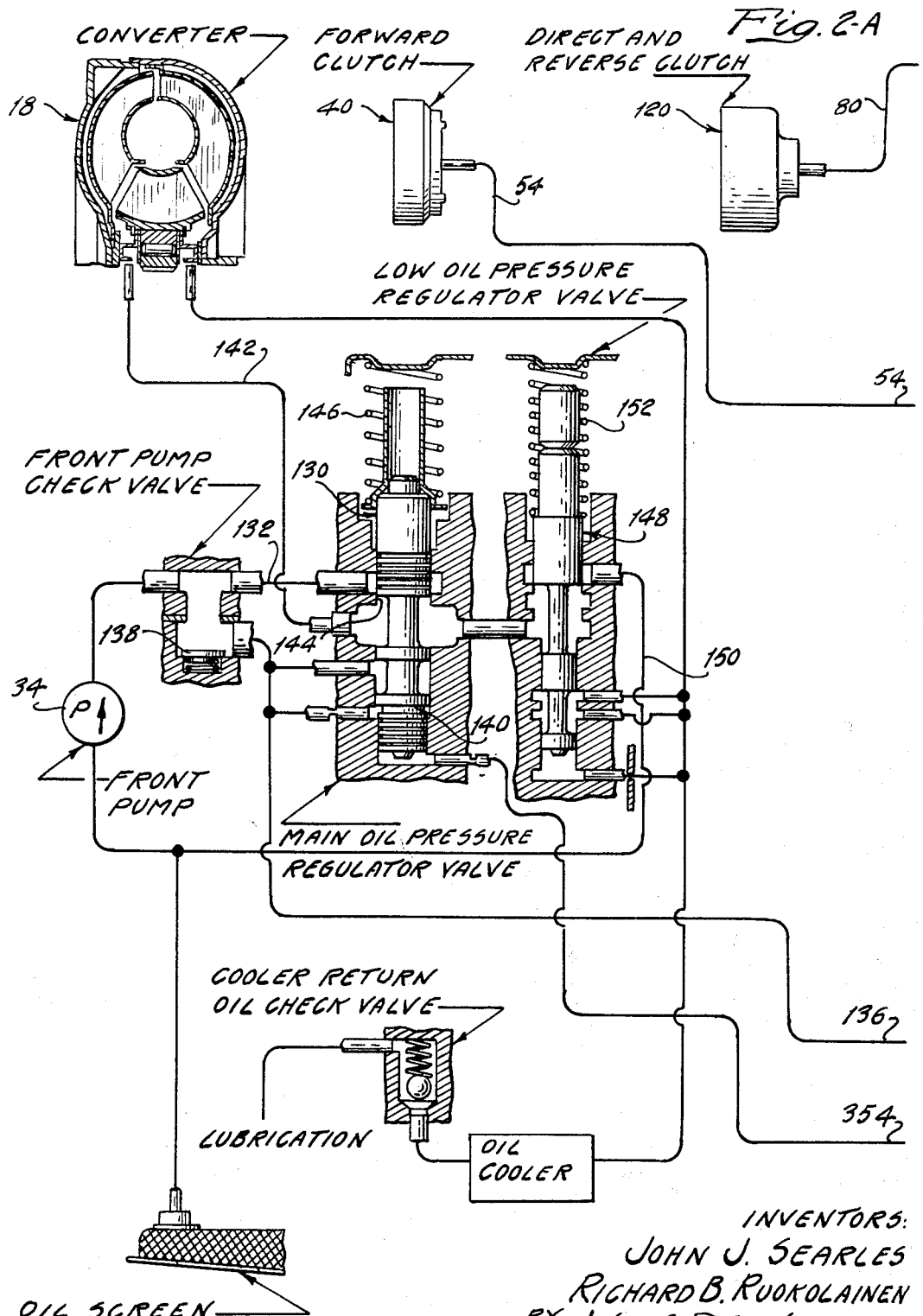

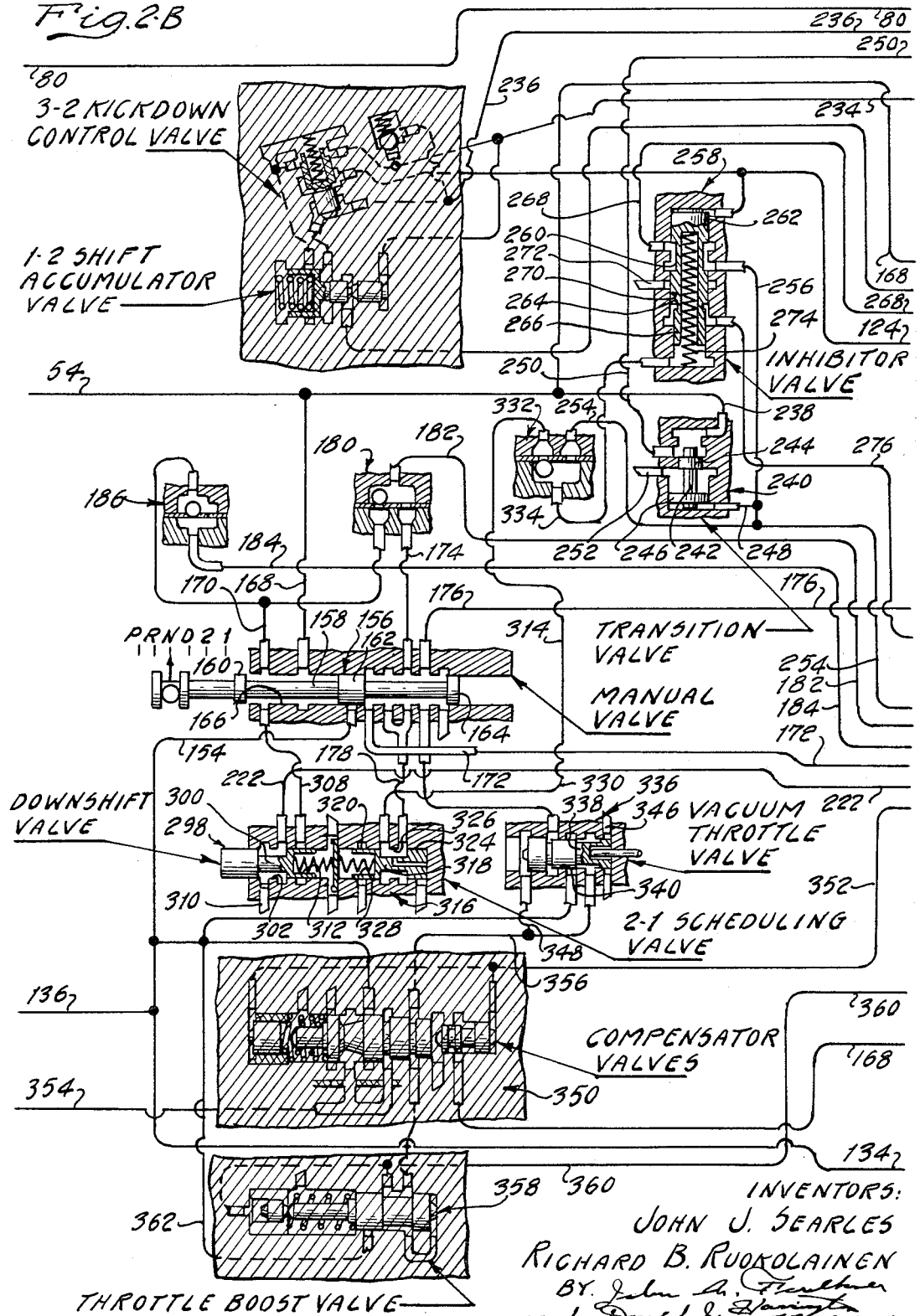

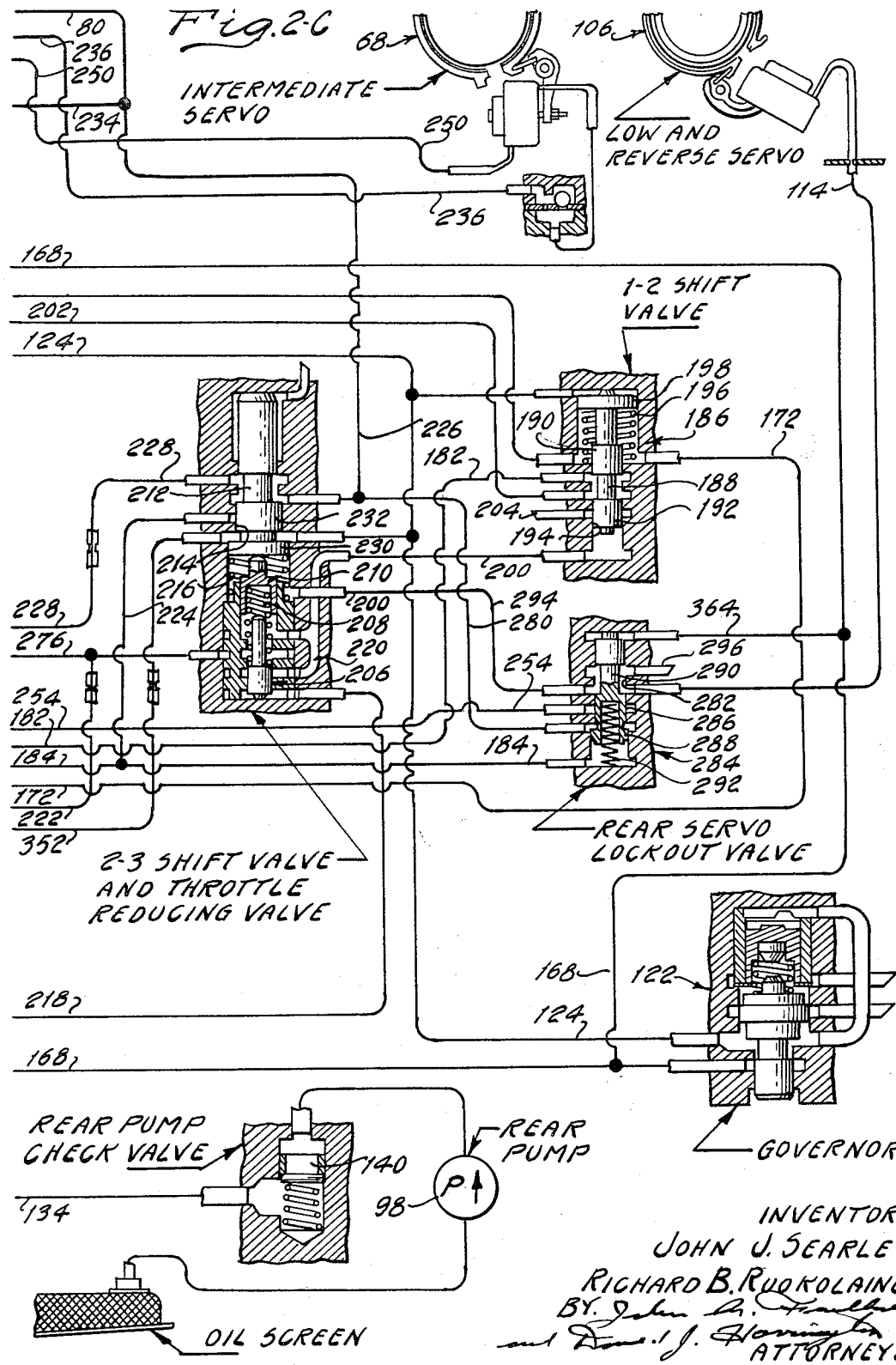

3,405,575
AUTOMATIC CONTROL VALVE SYSTEM FOR A MULTIPLE RATIO POWER TRANSMISSION MECHANISM
John J. Searles, Northville, and Richard B. Ruokolainen, Livonia, Mich., assignors to Ford Motor Company, Dearborn, Mich., a corporation of Delaware
Filed May 9, 1967, Ser. No. 637,129
15 Claims. (Cl. 74—868)

ABSTRACT OF THE DISCLOSURE

This application describes a control valve circuit for a multiple-ratio, power transmission mechanism for use in automotive vehicle drivelines. The circuit includes both semi-automatic and fully automatic performance characteristics as it establishes any one of several forward driving speed ranges. The fully automatic functions of the control circuit can be overruled by the vehicle operator by imposing selected control requirements on the automatic valve elements which replace the requirements imposed by the control pressure signals normally associated with the automatic drive range.

During acceleration of the vehicle the ratio upshifting tendencies are controlled by one valve subcircuit and the ratio downshifting tendencies are controlled by a separate and independent valve subcircuit so that the calibration of one will not influence adversely the calibration of the other.

Brief summary of the invention

This application comprises a planetary gear transmission having torque delivery gear elements, the relative motion of which can be controlled by friction clutch and brake devices operated by fluid pressure actuated servos. The transmission includes a positive displacement pump for supply fluid pressure to the servos.

Conduit structure connects the pump with the servos. The conduit structure is defined in part by multiple shift valves that respond to operating variables such as vehicle speed and engine torque. A multiple-position manual valve, which is located between the shift valves and the fluid pressure source, can assume any one of three forward drive operating positions to condition the shift valves for automatic ratio changing tendencies or for continuous operation in either of two underdrive ratios.

Downshifts from an intermediate underdrive ratio to the lowest underdrive ratio are achieved by a distributor valve assembly that is independent of the shift valve that controls a ratio change from the lowest ratio to the intermediate ratio. Provision is made for establishing a constant shift point during ratio changes from an intermediate speed ratio to the low speed ratio regardless of changes in engine torque as measured by engine intake manifold pressure.

Brief description of the figures of the drawings

FIGURE 1 shows a schematic diagram of a gear system capable of embodying the improved control valve circuit of our invention.

FIGURES 2A, 2B and 2C show in schematic form my improved control valve circuit.

Particular description of the invention

Numeral 10 designates an internal combustion engine for an automotive vehicle driveline. It is provided with an air-fuel mixture intake manifold system including a carburetor 12. The engine includes a crankshaft 14 that is connected to the impeller shell 16 of a hydrokinetic torque converter unit 18. This unit includes a bladed impeller member 20 connected to the shell 16, a bladed turbine member 22 and a bladed stator member 24. The bladed members are situated in toroidal fluid flow relationship in the usual fashion.

A stationary stator sleeve shaft 26 is connected directly to the transmission housing shown in part at 28. The bladed stator 24 is braked against the shaft 26 by an overrunning brake 30 to inhibit rotation of the stator in a direction opposite to the direction of rotation of the impeller, but permitting freewheeling motion in the same direction of rotation. The hub of the impeller 18 is connected as shown at 32 to a positive displacement pump 34 which serves as a fluid pressure source for the control system which will be described subsequently. This pump is identified in the circuit drawing of FIGURE 2A as the front pump.

Turbine 22 is connected to a centrally disposed turbine shaft 36 which in turn is connected to a clutch drum 38 for a multiple disc clutch assembly 40. This clutch is identified in FIGURE 2A as the forward clutch.

The drum 38 defines an annular cylinder 42 within which is positioned a piston 44. The piston and cylinder define a pressure cavity which receives clutch pressure to produce a clutch engaging force which establishes a driving connection between clutch plates 46 carried by the drum 38 and clutch discs 48 connected to clutch hub 50 which in turn is drivably connected to power shaft 52. Fluid pressure is admitted to the chamber for the forward clutch through feed passage 54 before it is transferred from the piston 44 to the clutch discs through Belleville spring 56, which is pivoted at its outer periphery in the drum 38. The inner periphery of the spring 56 engages the piston. Spring 56 acts as a leverage for multiplying the piston force as the clutch is engaged. It acts also as a piston return spring upon disengagement of the clutch.

The clutch drum 38 is formed with a clutch element 58 which carries clutch discs 60. These cooperate with clutch plates 62 carried by clutch drum 64. An intermediate speed ratio brake band 66 surrounds the drum 64. Band 66 is applied and released by fluid pressure operated brake servo 68 which comprises a cylinder 70 within which is positioned a brake piston 72. Force is applied to the operating end of the band 66 through a brake operating lever 74.

The drum 64 defines an annular cylinder 76 within which is positioned an annular piston 78. Fluid pressure is admitted to the working chamber behind the piston 78 through a feed passage 80.

Clutch drum 64 is connected to sleeve shaft 82 for sun gear 84. This forms a part of a compound planetary gear unit 86, which includes also a set of long planet pinions 88 engageable drivably with the sun gear 84. The planetary gear unit includes also a set of short planet pinions 90 which engage drivably the second sun gear 92 connected drivably to power shaft 52. Ring gear 94 engages drivably the planet pinions 88. Pinions 88 engage also pinions 90. Ring gear 94 is connected to power output shaft 96. A rear pump 98 is drivably connected to shaft 96.

Pinions 88 and 90 are rotatably journaled on a common carrier 100. A brake drum 102 forms a part of the carrier 100. It is surrounded by a low-and-reverse brake band 104. This band is applied and released by fluid pressure operated servo 106. It comprises a cylinder 108 and a piston 110. A brake operating linkage 112 transfers the force of piston 110 to the operating end of the band 104. Fluid pressure is supplied to the working chamber behind the piston 110 through a pressure feed passage 114.

An overrunning brake 116 is adapted to anchor the carrier 100 against rotation in one direction, but it permits freewheeling motion in the opposite direction. The stationary race for the brake 116 is connected to the housing 28 through an intermediate wall 118.

Low speed ratio operation is achieved by engaging the forward clutch 40. Turbine torque then is delivered from turbine 22 to the shaft 52 through the clutch 40 and to the sun gear 92. The ring gear 94 acts as a power output member as the carrier 100 acts as a reaction member, the reaction torque on the carrier 100 being transferred through the brake 116 to the transmission housing.

Intermediate speed ratio operation is achieved by engaging the intermediate speed ratio brake band 66 as clutch 40 continues to be applied. Sun gear 84 now acts as a reaction member and the carrier 100 rotates about the axis of the gearing to produce an increased output speed of the ring gear 94 with respect to the input speed of the sun gear 92. Overrunning brake 116 freewheels under these conditions.

Direct drive, high speed ratio operation is achieved by engaging simultaneously the forward clutch 40 and the direct-and-reverse clutch which is identified in FIGURE 1 by reference character 120. This locks together the sun gears for rotation in unison. Both brake bands 66 and 104 are released.

Reverse drive operation is achieved by disengaging the forward clutch 40 and engaging the direct-and-reverse clutch 120. As brake band 104 is applied, brake band 66 released. Turbine torque then is delivered through the clutch 120 to the sun gear 84 which causes ring gear 94 to be rotated in a direction opposite to the direction of rotation of the sun gear 84. The carrier again acts as a reaction member.

Continuous low speed ratio operation is achieved by engaging the brake band 104 to complement the action of the overrunning brake 116. As forward clutch 40 is applied, clutch 120 and brake band 66 are released.

A compound governor valve assembly 122 is connected drivably to the power output shaft 96. It supplies a governor pressure signal through passage 124 to speed sensitive portions of the control system indicated generally by reference character 128. Road wheels 126 are connected drivably to the power output shaft 96 through a suitable differential-and-axle assembly and through a driveshaft, not shown.

The control system 128 is indicated in schematic form in FIGURES 2A, 2B and 2C. The rear pump 98 and the front pump 34 act in cooperation to supply pressure to the main oil pressure regulator valve 130. Pressure is distributed to valve 130 from the pump 34 through passage 132. Passage 134 extends from the rear pump to passage 136 which also communicates with the valve 130 and with passage 132 to one-way check valve 138. A second one-way check valve 140 is located in passage 134. Valve 140 is closed when the front pump acts as a supply pressure source and valve 138 is opened. During push starts and under certain conditions when the vehicle is coasting at relatively high speeds, valve 140 is opened and valve 138 is closed. The rear pump then acts as a pressure supply source.

Regulator valve 130 includes a series of multiple lands that define a differential area 140 which communicates with passage 136. A low pressure bypass passage 142 extending to the hydrokinetic torque converter 18 communicates with the valve chamber 144 for the regulator valve 130. The regulator valve controls the degree of bypass between the passage 132 and the passage 142 to produce a regulated pressure in passage 132 which is dependent upon the calibration of valve springs 146 acting on the regulator valve 130.

The magnitude of the pressure in passage 142 in turn is controlled by a low oil pressure regulator valve 148 which has lands defining a differential area that is in fluid communication with the pressure in passage 142. The output side of the regulator valve 148 extends to the transmission sump through return passage 150. The sump is located in the lower region of the transmission housing.

The magnitude of the pressure maintained in passage 142 is dependent upon the calibration of valve spring 152 which acts on the valve 148.

The regulated pressure in passage 136 is distributed to passage 154, which extends to the manual valve 156. This comprises a valve element 158 which has valve lands 160, 162 and 164. These are situated in valve chamber 166 which has cooperating valve lands. The manual valve element 158 can be shifted to any one of several operating positions which are indicated by the reference legends R, N, D, 2 and 1. These respectively identify the positions corresponding to reverse drive, neutral, automatic drive operation, second speed ratio operation and first speed ratio operation. The lands of the manual valve distribute pressure from passage 154 to various communicating passages including passage 168 which is pressurized when the manual valve assumes the D position, the 1 position and the 2 position. At other times its passage is exhausted. Passage 170 which communicates also with chamber 166 is pressurized when the manual valve assumes the D position.

Passage 172 is pressurized when the manual valve is shifted to the 2 position, the 1 position and the reverse position. Passage 174 communicates with the valve chamber 166 and is pressurized when the manual valve assumes the 1 position and the reverse position. Passage 176 which communicates also with chamber 166 is pressurized when the manual valve assumes the reverse position. Passage 178 is connected to passage 174 across the manual valve and is pressurized whenever passage 174 is pressurized. A three-way check valve assembly 180 establishes controlled communication between passage 174 and passage 182 and between passage 170 and passage 182. Passage 170 communicates also with passage 184 through one-way check valve assembly 186. This valve assembly causes restricted fluid flow between passages 170 and 184 through a companion flow control orifice, but it permits unrestricted fluid flow from passage 184 to passage 170.

Passage 182 extends to 1–2 shift valve assembly 186. It acts as a feed passage for the shift valve assembly.

Valve assembly 186 includes a valve spool 188 having a pair of valve lands 190 and 192. These lands are received within a valve chamber 194 having registering valves and lands. Valve spring 196 in the valve chamber acts on a governor pressure valve means 198 formed on the valve element 188.

Pressure is distributed to the differential area of lands 198 and 190 through passage 172 when the manual valve is in the reverse position, position 1 and position 2. This supplements the action of the valve spring 196. Governor pressure from passage 124 is distributed to the upper end of the governor pressure land 198. The force of the governor pressure is opposed by the force of the modulated throttle pressure in passage 200 which communicates with the lower end of the land 192.

When the valve element 198 is positioned as shown in FIGURE 2C, communication is established between passage 182 and pasage 202 which extends to the inhibitor valve as will be explained subsequently. When the valve element 188 assumes a downward position, passage 202 is brought into communication with exhaust port 204 and passage 182 becomes blocked by land 190.

Modulated throttle pressure in passage 200 is developed by a throttle pressure reducing valve 206 which comprises a single diameter valve element biased in a downward direction by valve spring 208. One end of the valve spring engages a valve seat 210 which acts against a multiple land valve element 212 situated in a valve chamber 214. Valve element 212 is shifted in an upward direction by valve spring 216.

The throttle reducing valve is slidably situated in a valve sleeve which is ported to provide communication with a throttle pressure passage 218. The throttle pressure in passage 218 acts on the lower end of the throttle reducing valve, and the latter modulates it to produce a reduced throttle pressure in passage 220 which acts on the lower end of the spring seat 210 to supplement the force of spring 216 acting on the valve element 212. Passage 222, which normally is exhausted through the downshift valve to be described subsequently, communicates with the interior of the valve sleeve for the throttle reducing valve.

Passage 184, which is pressurized during operation in the D drive range only, communicates with passage 224. The 2–3 shift valve element controls communication between the passage 224 and passage 226 which extends to the direct-and-reverse clutch feed passage 80. When valve element 212 is positioned as shown, passage 224 is blocked and passage 226 communicates with passage 228 through the 2–3 shift valve chamber. This passage is exhausted whenever the manual valve is positioned in any range other than the reverse drive range position. When the valve element 212 is shifted to the upshift position, which is the lowermost position as viewed in FIGURE 2C, passage 226 is pressurized by the control pressure in passage 224 when the manual valve is in the D position.

Governor pressure in passage 124 is distributed to the differential area defined by the 2–3 shift valve lands 230 and 232. This produces a governor pressure force that is opposed by the force of the modulated throttle pressure passage 220. Passage 226 communicates also with passage 234 which extends to the 3–2 kickdown control valve assembly with the intermediate servo release pressure passage 236.

Passage 168 communicates with passage 54 which in turn extends to passage 238. The transition valve 240 includes a valve element 242 that is subjected to pressure in passage 238. Passage 238 is pressurized whenever the manual valve is in the 1 or 2 positions.

Valve element 242 includes a small valve land 244 and a larger valve land 246, the former being pressurized by the pressure in passage 238 and the latter being pressurized by the pressure in passage 248. When the valve element 242 assumes the position shown, passage 238 is brought into communication with feed passage 250 for the apply side of the intermediate servo. When the valve element 242 assumes an upward position, however, passage 238 becomes blocked and passage 250 becomes connected to exhaust port 252. Passage 248 is in communication with passage 254 which is pressurized with a regulated pressure from the scheduling valve subsequently to be described under some conditions and which is pressurized by control pressure under other conditions when the manual valve is in the 1 position.

Passage 248 is in communication with passage 256 which extends to the inhibitor valve 258. The valve comprises a valve element 260 having three spaced valve lands 262, 264 and 266. Passage 256 communicates with passage 268 through the valve chamber 270 for the inhibitor valve whenever the inhibitor valve element 260 is in the position shown in FIGURE 2B. When the inhibitor valve is in a downward position, passage 256 is exhausted through exhaust port 272. Valve element 260 is urged normally in an upward direction as viewed in FIGURE 2B by valve spring 274.

Valve land 266 is slightly smaller than land 270 thereby producing a differential area that is in communication with passage 276. Passage 276 communicates with passage 222 which in turn extends to the downshift valve. It normally is exhausted, but it is pressurized with control pressure when the downshift valve is actuated, as will be explained, and when the manual valve is in the D position. Passage 124, which is pressurized with governor pressure, communicates with the upper end of valve chamber 270 thereby producing a governor pressure force that normally tends to overcome the force of spring 274. The same pressure in passage 124 communicates also with the upper end of land 198 for the 1–2 shift valve assembly. It communicates also with the differential area of lands 230 and 232 on the 2–3 shift valve assembly.

Passage 226 extends to passage 280 which in turn communicates with valve chamber 282 of the rear servo lock-out valve 284. The pressure in this passage acts on the differential area of valve lands 286 and 288 of the rear servo lock-out valve 284. The valve 284 includes a valve element 290 which is biased in an upward direction by valve spring 292. Passage 254 communicates directly with the lock-out valve 284. It communicates also through the lock-out valve with the feed passage 114 for the low-and-reverse servo 106 when the lock-out valve is in a downward position as viewed in FIGURE 2C. At the same time passage 254 communicates with passage 292 through the valve chamber 282 when the valve element 230 is in a downward position. Passage 294 extends to the lower side of the 2–3 shift valve land 230 to produce a force on the valve element 212 that supplements the force of spring 216.

When the valve element 290 assumes an upward position, passage 114 is exhausted through exhaust port 296.

A downshift valve is shown at 298. It includes a valve element 300 that is slidably situated in the valve chamber 302. Element 300 is connected mechanically to an accelerator pedal 304, as seen in FIGURE 1, which in turn is connected mechanically to the engine carburetor 12 through a mechanical linkage 306. Upon movement of the engine throttle valve to the wide-open position, valve element 300 is shifted in a right-hand direction thereby establishing communication between passage 308 and passage 222. When the throttle valve is in any position other than the wide-open position, however, passage 222 is exhausted through exhaust port 310. Valve spring 312 normally urges the valve element 300 in a left-hand direction. Passage 308 is pressurized only when the manual valve is in the D position. At other times it is exhausted.

Passage 178, which is pressurized when the valve is in the 1 position, communicates with passage 314 through a scheduling valve identified generally by reference character 316. The valve includes a valve element 318 having spaced valve lands 320 and 324 situated in the valve chamber 326. Valve element 318 is biased in a right-hand direction as seen in FIGURE 2B by valve spring 328. Valve element 318 acts as a regulator valve which regulates the pressure in passage 326 to produce a modified, reduced pressure in passage 330 which communicates with the chamber 326 adjacent passage 178. A feedback passage in the valve element 318 distributes regulated pressure to the right-hand end of land 324 thereby producing a force that balances the force of the spring 328.

The reduced control pressure in passage 330 is distributed through a three-way check valve 332 to passage 334 which extends in turn to the lower end of the inhibitor valve land 266.

A vacuum throttle valve 336 establishes a pressure signal that is proportional in magnitude to the engine manifold vacuum. It includes a valve element 338 that is slidably situated in the valve chamber 340. It is connected mechanically to an engine throttle valve actuator diaphragm 342 shown in FIGURE 1. The diaphragm forms part of a vacuum chamber that is in communication through passage 344 with the engine intake manifold on the downstream side of the engine carburetor throttle. The throttle chamber 340 communicates with an exhaust port 346. Feedback pressure acts on the left-hand side of the valve element 338 through feedback pressure passage 348.

The output side of the vacuum throttle valve 336 communicates with compensator valve 350. Governor pressure passage 124 is in fluid communication with passage 352 and this passage in turn also communicates with the compensator valve 350. The two signals acting upon the compensator valve 350 produce a resultant signal in passage 354 that acts upon the lower end of the main oil pressure regulator valve 130. When the magnitude of the throttle pressure increases for any given engine speed, the pressure in passage 354 is reduced and this in turn results in an augmentation in the regulated line pressure since the force of the pressure in passage 354 which opposes the force of the valve spring 146 becomes reduced. Conversely, a decrease in throttle pressure for any given speed results in an increase in line pressure maintained by the main oil pressure regulator valve.

The output of the vacuum throttle valve is distributed to the compensator valve through passage 356. This same passage communicates with throttle boost valve 358 which modifies the pressure in passage 356 to produce an augmented pressure in passage 360. This augmentation is obtained by the throttle boost valve as it regulates control pressure in passage 362 which communicates directly with a line pressure passage 136.

The pressure in passage 360 is used to establish the shift points as it is distributed to passage 218 and hence to the throttle reducing valve 206.

The magnitude of the pressure in passage 360 is designed to sense the magnitude of the engine torque demand as distinguished from the actual engine torque. The output signal of the vacuum throttle valve, on the other hand, is more closely related to manifold pressure and hence engine torque, and it is this signal therefore that is used to influence the operation of the main oil pressure regulator valve rather than the signal of passage 360.

If we assume that the manual valve is shifted to the 1 position, passage 174 becomes pressurized. Passage 170 at that time is exhausted. Therefore the three-position valve 180 will cause pressure distribution to occur from passage 174 to passage 182. Control pressure is distributed then through passage 182 and through the 1-2 shift valve to passage 202 which extends through the inhibitor valve 258 to passage 256. This causes the lower end of the transition valve to become pressurized. The transition valve then moves upwardly to exhaust passage 250 through port 252. The apply side of the intermediate servo then becomes exhausted.

The pressure in passage 256 is distributed through the valve 332 to the passage 334 which holds the inhibitor valve in the position shown in FIGURE 2B. The inhibitor valve then does not respond to changes in governor pressure acting on the land 262.

The rear servo lock-out valve is pressurized with control pressure as control pressure is distributed to it through passage 364. This passage in turn communicates with the forward clutch feed passage 54, and is pressurized when the manual valve is in the D position, the 1 position or the 2 position. Pressurized passage 254 communicates with the low-and-reverse servo feed passage 114 through the rear servo lock-out valve thereby applying the low-and-reverse servo.

Passage 172 which is pressurized when the manual valve assumes the 1 position, is effective to distribute control pressure to the lower end of land 198 thereby maintaining the 1-2 shift valve in the downshift position. The transmission thus operates continuously in the low speed ratio when the vehicle is accelerated from a standing start with the manual valve in the 1 position.

If the manual valve is shifted to the 2 position, the forward clutch continues to be applied. Passage 182 becomes exhausted through the manual valve. Since the 1-2 shift valve is held in the position shown in FIGURE 2C, exhausted passage 182 is brought into communication with passage 202 through the 1-2 shift valve 186. Exhausted passage 202 then exhausts passage 256 through the inhibitor valve. Since the lower end of the transition valve now becomes exhausted, the transition valve is shifted under the influence of forward clutch pressure in passage 238 to the position shown in FIGURE 2B thereby applying front clutch pressure to passage 250 which applies the intermediate servo 68. The low-and-reverse servo remains exhausted and the intermediate servo remains applied thereby establishing continuous operation in the intermediate speed ratio. Passage 224 is exhausted through passage 170 and the valve 186. Therefore the 2-3 shift valve would have no influence on the speed ratio that the transmission mechanism assumes.

If it now is assumed that the manual valve is shifted to the D position, passage 170 becomes pressurized and passage 174 remains exhausted. Thus passage 184 becomes pressurized and this feeds the 2-3 shift valve through the passage 224. The rear servo lock-out valve at this time shifts in an upward direction because of the pressure force introduced to the lower end of the land 288. Pressure distribution to the low-and-reverse servo then is prevented. Torque reaction of the rear carrier during low-speed ratio operation in the automatic drive range thus is accommodated only by the over-running brake 116 rather than also by the brake band 104.

The 1-2 shift valve 186, which no longer receives pressure from passage 172, is capable of controlling a 1-2 upshift during acceleration. When the force of the governor pressure overcomes the influence of the throttle pressure from the throttle boost valve, communication between passage 182 and passage 202 will be blocked and passage 202 will be exhausted through exhaust port 204. This will cause the lower end of the transition valve to become exhausted thereby allowing clutch pressure to be distributed from passage 238 to the apply side of the intermediate servo through passage 250. Pressure is distributed also from passage 256 through the valve 332 to the lower end of the inhibitor valve. The inhibitor valve at this time is in the position shown in FIGURE 2B, which will permit free communication between passages 268 and 256.

Continued acceleration in the intermediate speed ratio ultimately will cause the governor pressure to develop to a point where the 2-3 shift valve moves in a downward direction against the opposing influence of modulated throttle pressure in passage 220. Passage 226, which previously was exhausted through the 2-3 shift valve and through passage 228, now becomes connected directly to the passage 224 which is a fed passage for the 2-3 shift valve. The clutch 120 now becomes pressurized and the release side of the servo 68 also becomes pressurized through passage 236 which is connected to passage 226 through the 3-2 kickdown control valve assembly. Since both brakes now are released and both clutches are applied, the transmission is in condition for direct drive operation.

The scheduling valve 316 produces a constant pressure in passage 330 which is dependent upon the calibration of the spring 328. This modulated pressure is distributed to passage 334 which causes the control pressure to act upon the inhibitor valve. If it is assumed that the vehicle is coasting at a relatively high speed and the manual valve is shifted to the 1 position, the inhibitor valve will assume a downward position thereby preventing pressure distribution from passage 268 to passage 256 and, hence, through the rear servo lock-out valve to the low-and-reverse servo. The inhibitor valve will prevent also distribution of pressure to the lower end of the transition valve. Thus the intermediate servo remains applied although the manual valve is in the 1 position. This condition continues during coasting until the vehicle speed reaches a value that is sufficiently low to allow the inhibitor valve to move in an upward direction under the influence of the spring 274 and the controlled pressure in passage 334. This 2-1 downshift during coasting will occur always at the same shift point because of the functioning of the scheduling valve. It is apparent, therefore, that automatic 2-1 downshifts during coasting are controlled exclusively by the inhibitor valve rather than by the 1-2 shift valve. On the other hand, 1-2 upshifts, as has been seen, are controlled exclusively by the 1-2 shift valve and not by the inhibitor valve.

When a coasting 2-1 downshift occurs, the line pressure that is readmitted to the passage 256 is immediately transferred to passage 254 and then through the valve 332 to the passage 334. Thus the modulated pressure in passage 334 now is replaced by line pressure immediately upon completion of the shift. This condition causes the inhibitor valve to remain in the low speed ratio position regardless of subsequent increases in the vehicle speed as the vehicle is accelerated with the manual valve in the 1 position.

If the manual valve is shifted to the reverse position R, passage 168 becomes exhausted. This then causes the upper end of the rear servo lock-out valve to become exhausted. The valve then moves upwardly under the influence of the spring 292 causing the passage 114 to become exhausted through exhaust port 296. The feed passage 54 for the forward clutch becomes exhausted through the manual valve. At this time the 2–3 shift valve establishes a connection between passage 226 and passage 228.

Passage 228, as mentioned earlier, is pressurized during reverse drive. Thus pressure is distributed directly to the direct-and-reverse clutch 120. This same pressure in passage 226, which is distributed to the direct-and-reverse clutch, acts upon the differential area of lands 286 and 288 of the rear servo lock-out valve. When clutch pressure is developed in the direct-and-reverse clutch, and the magnitude of this pressure is sufficient to maintain clutch capacity, the valve element 290 will shift in a downward direction thereby establishing a direct connection between passage 254 and passage 114 which feeds the low-and-reverse servo 106. Passage 254 is pressurized by the pressure in passage 256 which in turn communicates through the inhibitor valve with pressurized passage 268. This passage in turn is pressurized by the pressure in passage 182 which is distributed to it through the 1–2 shift valve when the latter is in the position shown in FIGURE 2C. The function of the rear servo lock-out valve at this time is to assure that the direct-and-reverse clutch will become applied at a time prior to the application of the low-and-reverse servo when the manual valve is shifted to the reverse position. This eliminates the harshness in the engagement of the reverse drive train.

What we claim and desire to secure by U.S. Letters Patent is:

1. A multiple ratio automatic power transmission mechanism adapted to deliver driving torque from a driving shaft to a driven shaft, gearing comprising relatively movable gear elements for establishing multiple torque delivery paths between said driving shaft and said driven shaft, clutch and brake means for controlling the relative motion of said gear element to establish selectively various forward driving speed ratios, separate fluid pressure operating servos for actuating and releasing said clutch and brake means, a fluid pressure source, conduit structure interconnecting said pressure source and said servos including a first low and intermediate ratio shift valve and a second intermediate and high ratio shift valve, the lowest speed ratio servo comprising a servo apply pressure chamber, the intermediate speed ratio servo comprising an apply chamber and a release chamber, a high speed ratio clutch hydraulically connected to the release chamber of said intermediate servo whereby it becomes applied as the latter becomes released, a branch pressure passage extending from the first shift valve to said low speed ratio servo, an inhibitor valve situated in said branch passage and adapted to move between a branch passage blocking position and a branch passage opening position, a source of a first pressure signal that is proportional in magnitude to the driven speed of said driven shaft, a source of a second pressure signal that is proportional in magnitude to the torque delivery requirements, said first pressure signal being connected to said inhibitor valve to urge the same normally to a branch passage blocking position, means for biasing said inhibitor valve against the opposing influence of said first pressure signal, said second ratio shift valve connecting said source to said direct drive clutch and the apply chamber of said intermediate servo, a second branch passage extending to said direct clutch and said apply chamber and being defined in part by said second ratio shift valve, the latter being adapted to move between a second branch passage exhausting position and a second branch passage pressure distribution position, and a multiple position manual valve means situated between said pressure source and said shift valves for applying a control pressure to said first shift valve to inhibit its operation when it assumes a first speed ratio position whereby ratio changes between said intermediate ratio and said low speed ratio are controlled by said inhibitor valve.

2. A multiple ratio automatic power transmission mechanism adapted to deliver driving torque from a driving shaft to a driven shaft, gearing comprising relatively movable gear elements for establishing multiple torque delivery paths between said driving shaft and said driven shaft, clutch and brake means for controlling the relative motion of said gear element to establish selectively various forward driving speed ratios, separate fluid pressure operating servos for actuating and releasing said clutch and brake means, a fluid pressure source, conduit structure interconnecting said pressure source and said servos including a first low and intermediate ratio shift valve and a second intermediate and high ratio shift valve, the lowest speed ratio servo comprising a servo apply pressure chamber, the intermediate speed ratio servo comprising an apply chamber and a release chamber, a high speed ratio clutch hydraulically connected to the release chamber of said intermediate servo whereby it becomes applied as the latter becomes released, a branch pressure passage extending from the first shift valve to said low speed ratio servo, an inhibitor valve situated in said branch passage and adapted to move between a branch passage blocking position and a branch passage opening position, a source of a first pressure signal that is proportional in magnitude to the driven speed of said driven shaft, a source of a second pressure signal that is proportional in magnitude to the torque delivery requirements, said first pressure signal being connected to said inhibitor valve to urge the same normally to a branch passage blocking position, means for biasing said inhibitor valve against the opposing influence of said first pressure signal, said second ratio shift valve connecting said source to said direct drive clutch and the apply chamber of said intermediate servo, a second branch passage extending to said direct clutch and said apply chamber and being defined in part by said second ratio shift valve, the latter being adapted to move between a second branch passage exhausting position and a second branch passage pressure distribution position, a multiple position manual valve means situated between said pressure source and said shift valves for applying a control pressure to said first shift valve to inhibit its operation when it assumes a first speed ratio position whereby ratio changes between said intermediate ratio and said low speed ratio are controlled by said inhibitor valve, and a fluid connection between said low speed ratio servo and said second shift valve whereby a pressure force is applied to said second shift valve when said low speed ratio servo is applied thereby overruling the automatic upshifting tendencies thereof.

3. A multiple ratio automatic power transmission mechanism adapted to deliver driving torque from a driving shaft to a driven shaft, gearing comprising relatively movable gear elements for establishing multiple torque delivery paths between said driving shaft and said driven shaft, clutch and brake means for controlling the relative motion of said gear element to establish selectively various forward driving speed ratios, separate fluid pressure operating servos for actuating and releasing said clutch and brake means, a fluid pressure source, conduit structure interconnecting said pressure source and said servos including a first low and intermediate ratio shift valve and a second intermediate and high ratio shift valve, the lowest speed ratio servo comprising a servo apply pressure chamber, the intermediate speed ratio servo comprising an apply chamber and a release chamber, a high speed ratio clutch hydraulically connected to the release chamber of said intermediate servo whereby it becomes applied as the latter becomes released, a branch pressure passage extending from the first shift valve to said low speed ratio servo, an inhibitor valve situated in said branch passage and adapted to move between a branch passage blocking position and a branch passage opening position, a source of a first pressure signal that is proportional in magnitude to the driven speed of said driven shaft, a source of a second pressure signal that is proportional in magnitude to the torque delivery requirements, said first pressure signal being connected to said inhibitor valve to urge the same normally to a branch passage blocking position, means for biasing said inhibitor valve against the opposing influence of said first pressure signal, said second ratio shift valve connecting said source to said direct drive clutch and the apply chamber of said intermediate servo, a second branch passage extending to said direct clutch and said apply chamber and being defined in part by said second ratio shift valve, the latter being adapted to move between a second branch passage exhausting position and a second branch passage pressure distribution position, a multiple position manual valve means situated between said pressure source and said shift valves for applying a control pressure to said first shift valve to inhibit its operation when it assumes a first speed ratio position whereby ratio changes between said intermediate ratio and said low speed ratio are controlled by said inhibitor valve, a fluid connection between said low speed ratio servo and said second shift valve whereby a pressure force is applied to said second shift valve when said low speed ratio servo is applied thereby overruling the automatic upshifting tendencies thereof, a transition valve comprising a movable valve element with one portion thereof in fluid communication with said first branch passage whereby it is shifted in a first direction when said first branch passage is pressurized, and a second portion of said transition valve element being in fluid communication with said pressure source whereby it is biased normally in the opposite direction, a portion of said conduit structure extending to said apply chamber of said intermediate servo being in fluid communication with said transition valve, said conduit structure portion being exhausted through said transition valve when said transition valve element assumes said first position and being brought into communication with said pressure source when said transition valve element moves in said opposite direction.

4. The combination set forth in claim 1 wherein said conduit structure includes a control passage extending from said manual valve to said inhibitor valve, a scheduling valve means in said control passage for establishing a modulated pressure therein which is independent of variations in the magnitude of said control pressure signals, the force of the pressure in said control passage opposing the force of said first pressure signal on said inhibitor valve whereby the speeds at which automatic ratio shifts occur from the intermediate speed ratio to the low speed ratio are relatively constant.

5. The combination set forth in claim 2 wherein said conduit structure includes a control passage extending from said manual valve to said inhibitor valve, a scheduling valve means in said control passage for establishing a modulated pressure therein which is independent of variations in the magnitude of said control pressure signals, the force of the pressure in said control passage opposing the force of said first pressure signal on said inhibitor valve whereby the speeds at which automatic ratio shifts occur from the intermediate speed ratio to the low speed ratio are relatively constant.

6. The combination set forth in claim 3 wherein said conduit structure includes a control passage extending from said manual valve to said inhibitor valve, a scheduling valve means in said control passage for establishing a modulated pressure therein which is independent of variations in the magnitude of said control pressure signals, the force of the pressure in said control passage opposing the force of said first pressure signal on said inhibitor valve whereby the speeds at which automatic ratio shifts occur from the intermediate speed ratio to the low speed ratio are relatively constant.

7. The combination as set forth in claim 4 wherein said transition valve and said control pressure passage are in fluid communication through a second control passage, and a two-position check valve means defining in part a portion of each of said control passages for establishing a direct connection between said control passages when both are pressurized as distribution of the regulated pressure of said scheduling valve is interrupted and for distributing regulated pressure from said scheduling valve to said first control passage as said second control passage is exhausted.

8. The combination as set forth in claim 5 wherein said transition valve and said control pressure passage are in fluid communication through a second control passage, and a two-position check valve means defining in part a portion of each of said control passages for establishing a direct connection between said control passages when both are pressurized as distribution of the regulated pressure of said scheduling valve is interrupted and for distributing regulated pressure from said scheduling valve to said first control passage as said second control passage is exhausted.

9. The combination as set forth in claim 6 wherein said transition valve and said control pressure passage are in fluid communication through a second control passage, and a two-position check valve means defining in part a portion of each of said control passages for establishing a direct connection between said control passages when both are pressurized as distribution of the regulated pressure of said scheduling valve is interrupted and for distributing regulated pressure from said scheduling valve to said first control passage as said second control passage is exhausted.

10. The combination as set forth in claim 4 wherein said first branch passage is defined in part by a low speed ratio servo lock-out valve having two operating positions, said lock-out valve exhausting said low servo when it assumes one position and establishing communication between said low servo and said manual valve when it assumes a second position, spring means normally biasing said lock-out valve to a servo exhausting position, said manual valve including also a reverse drive position, a reverse pressure passage communicating with said manual valve and with said pressure source through said manual valve when said manual valve assumes a reverse drive position, said reverse pressure passage being connected to said lock-out valve for opposing thereon a force normally tending to urge the latter to a pressure distributing position whereby servo pressure is distributed through said first branch passage only after a pressure of a predetermined magnitude develops first in the companion servo.

11. The combination as set forth in claim 5 wherein said first branch passage is defined in part by a low speed ratio servo lock-out valve having two operating positions, said lock-out valve exhausting said low servo when it assumes one position and establishing communication between said low servo and said manual valve when it assumes a second position, spring means normally biasing said lock-out valve to a servo exhausting position, said manual valve including also a reverse drive position, a reverse pressure passage communicating with said manual valve and with said pressure source through said manual valve when said manual valve assumes a reverse drive position, said reverse pressure passage being connected to said lock-out valve for opposing thereon a force normally tending to urge the latter to a pressure distributing position whereby servo pressure is distributed through said first branch passage only after a pressure of a predetermined magnitude develops first in the companion servo.

12. The combination as set forth in claim 6 wherein said first branch passage is defined in part by a low speed ratio servo lock-out valve having two operating positions, said lock-out valve exhausting said low servo when it assumes one position and establishing communication between said low servo and said manual valve when it assumes a second position, spring means normally biasing said lock-out valve to a servo exhausting position, said manual valve including also a reverse drive position, a reverse pressure passage communicating with said manual valve and with said pressure source through said manual valve when said manual valve assumes a reverse drive position, said reverse pressure passage being connected to said lock-out valve for opposing thereon a force normally tending to urge the latter to a pressure distributing position whereby servo pressure is distributed through said first branch passage only after a pressure of a predetermined magnitude develops first in the companion servo.

13. The combination as set forth in claim 7 wherein said conduit structure comprises a feed passage extending from said manual valve to said 2–3 shift valve, said feed passage being pressurized when said manual valve assumes an automatic drive range position and exhausted when said manual valve assumes another position, the feed passage for said 2–3 shift valve being exhausted through said manual valve when said manual valve assumes a second speed ratio position.

14. The combination as set forth in claim 8 wherein said conduit structure comprises a feed passage extending from said manual valve to said 2–3 shift valve, said feed passage being pressurized when said manual valve assumes an automatic drive range position and exhausted when said manual valve assumes another position, the feed passage for said 2–3 shift valve being exhausted through said manual valve when said manual valve assumes a second speed ratio position.

15. The combination as set forth in claim 9 wherein said conduit structure comprises a feed passage extending from said manual valve to said 2–3 shift valve, said feed passage being pressurized when said manual valve assumes an automatic drive range position and exhausted when said manual valve assumes another position, the feed passage for said 2–3 shift valve being exhausted through said manual valve when said manual valve assumes a second speed ratio position.

References Cited
UNITED STATES PATENTS

| | | | |
|---|---|---|---|
| 3,078,736 | 2/1963 | Meads et al. | 74—867 |
| 3,103,831 | 9/1963 | De Corte et al. | 74—677 |
| 3,226,927 | 1/1966 | Wayman | 60—12 |
| 3,237,476 | 3/1966 | Jandasek | 74—868 |
| 3,287,995 | 11/1966 | Leonard et al. | 74—864 |
| 3,296,884 | 1/1967 | Leonard | 74—864 |

ARTHUR T. McKEON, *Primary Examiner.*

UNITED STATES PATENT OFFICE
CERTIFICATE OF CORRECTION

Patent No. 3,405,575      Dated October 15, 1968

Inventor(s)     J. J. Searles et al

It is certified that error appears in the above-identified patent and that said Letters Patent are hereby corrected as shown below:

Column 9, line 75, cancel "apply" and substitute --release--.

Column 10, lines 2, 45 and 47, cancel "apply" and substitute --release--.

Column 11, lines 19 and 21, cancel "apply" and substitute --release--.

Signed and sealed this 4th day of January 1972.

(SEAL)
Attest:

EDWARD M. FLETCHER, JR.
Attesting Officer

ROBERT GOTTSCHALK
Acting Commissioner of Patent